Aug. 10, 1965
R. E. OGILVIE
3,200,248
APPARATUS FOR USE AS A GONIOMETER AND DIFFRACTOMETER
Filed Aug. 7, 1962
6 Sheets-Sheet 3
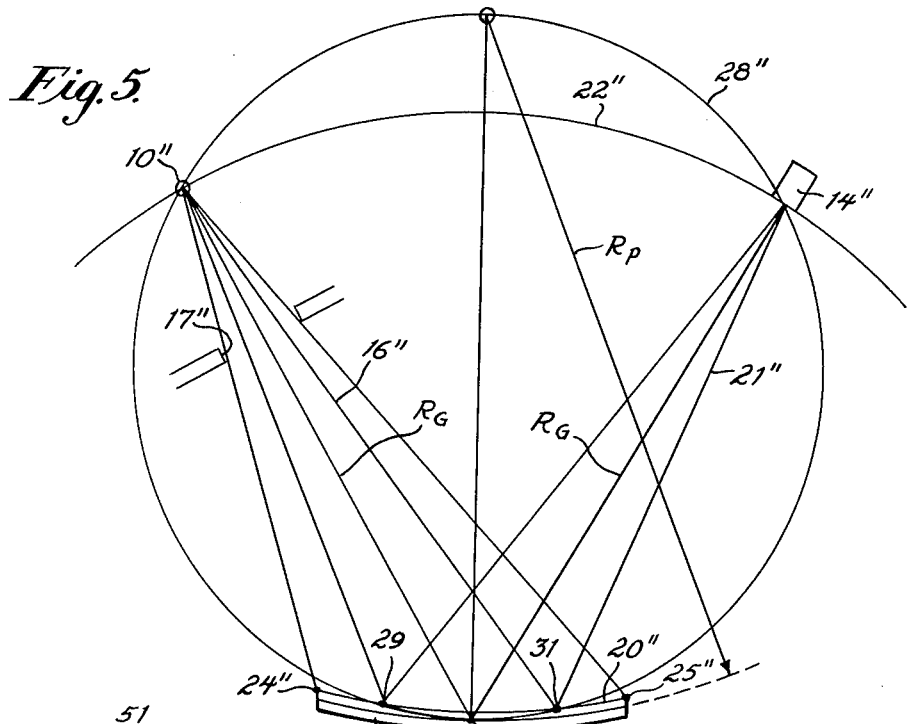
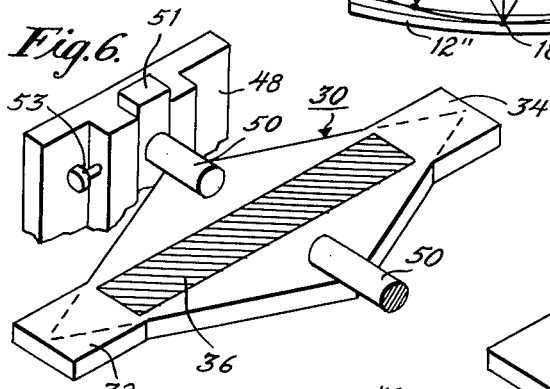
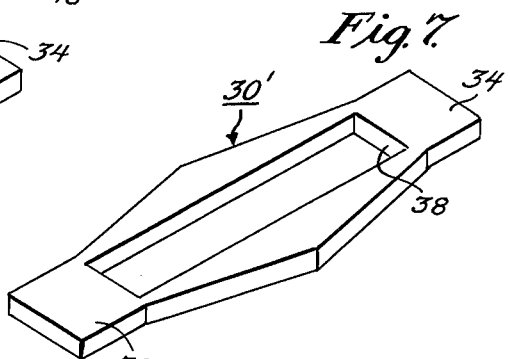
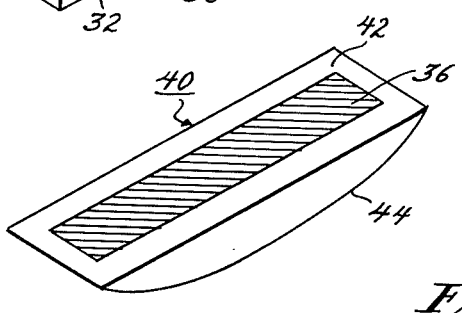
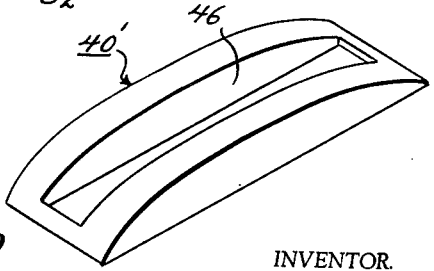
INVENTOR.
ROBERT E. OGILVIE
BY
Millman and Jacobs
ATTORNEYS

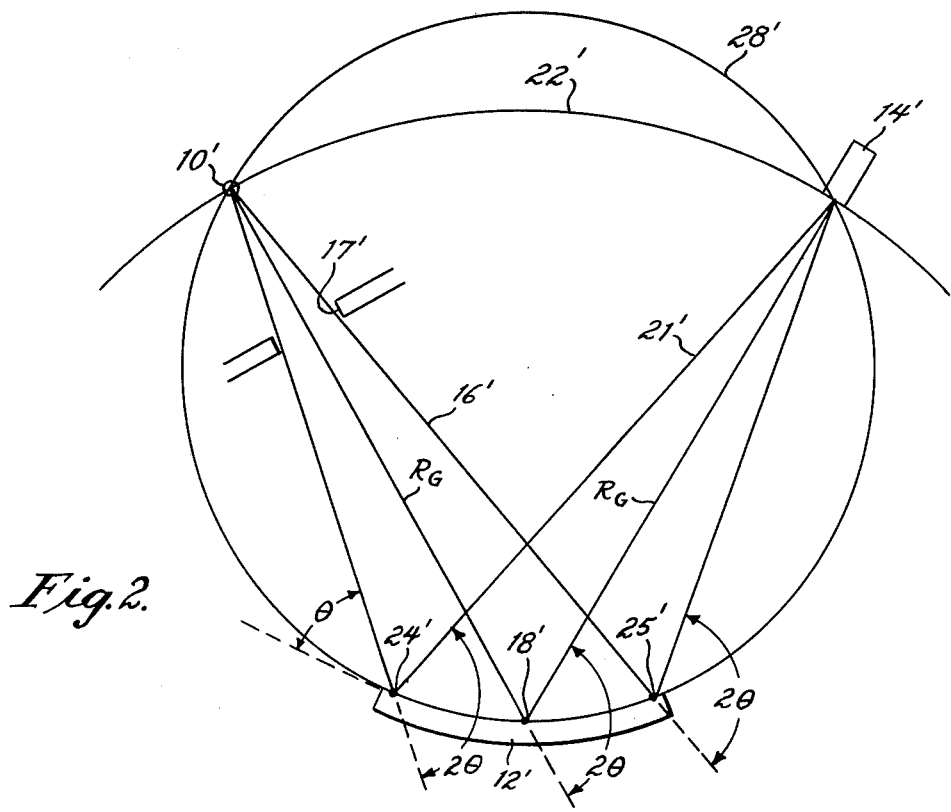
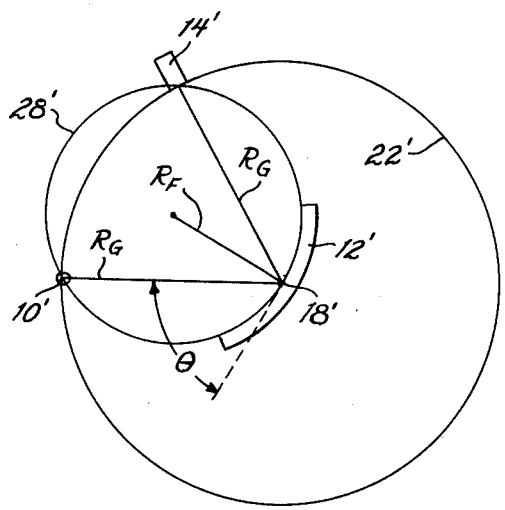
Fig. 2.
Fig. 4.
INVENTOR.
ROBERT E. OGILVIE

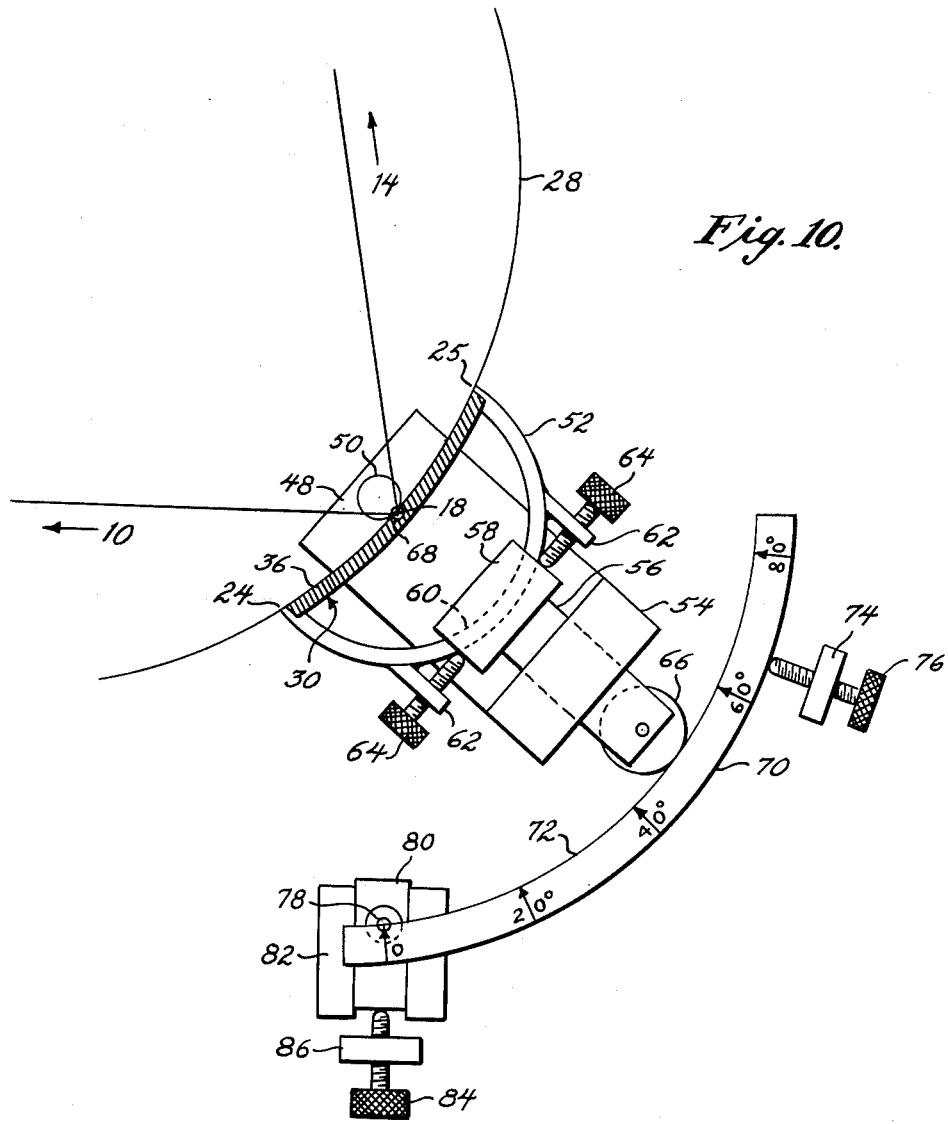

Aug. 10, 1965 R. E. OGILVIE 3,200,248
APPARATUS FOR USE AS A GONIOMETER AND DIFFRACTOMETER
Filed Aug. 7, 1962 6 Sheets-Sheet 5
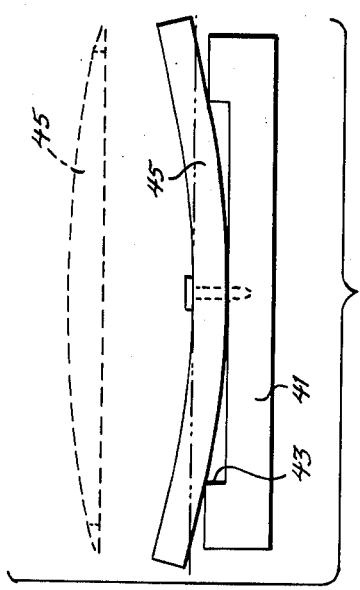
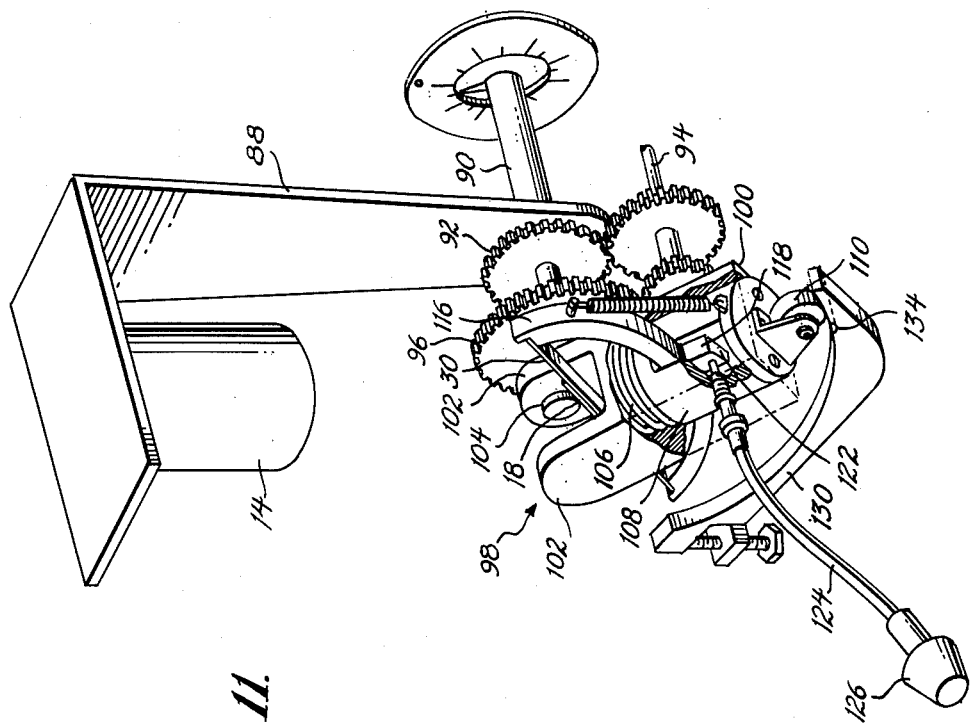
INVENTOR.
ROBERT E. OGILVIE
BY
ATTORNEYS.

United States Patent Office 3,200,248
Patented Aug. 10, 1965

3,200,248
APPARATUS FOR USE AS A GONIOMETER
AND DIFFRACTOMETER
Robert E. Ogilvie, Lexington, Mass., assignor to Advanced Metals Research Corporation, a corporation of Delaware
Filed Aug. 7, 1962, Ser. No. 215,362
26 Claims. (Cl. 250—51.5)

This invention relates to goniometers employing diffractable radiation, such as X-rays, neutrons or electrons.

The goniometer is used as a spectrometer in order to analyze the X-ray spectrum from a chosen source, to resolve the spectrum into its several wavelengths and to determine the relative intensity of each wavelength. A particularly practical application involves the use of an unknown specimen as the source which is excited by suitable means; i.e., X-rays or electrons, to emit its characteristic X-rays. The specimen becomes the source in the goniometer and an examination of its emitted spectrum as resolved at specific diffraction angles by the diffracting element of known characteristics permits a determination of the identity of the chemical elements present in the specimen and the relative amounts of each. Thus it constitutes a method of qualitative and quantitative analysis applicable to a wide variety of substances both solid and liquid.

The goniometer is employed as a diffractometer in order to investigate the basic atomic arrangement in various types of substances. The source of accurately known wavelengths, such as for instance an X-ray tube, provides a beam incident on the specimen, the latter constituting the diffracting element of the goniometer. An analysis of the diffraction angles of the several diffracted beams together with their relative intensities permits a reconstruction of the atomic pattern within the substance. In practice, the method is used to identify crystalline substances, to determine the manner in which the atoms are arranged, to measure precisely the interatomic distances, to determine the sizes of crystallites, to examine the orientation of crystals and to study strains, defects and imperfections in their structure. Although the principal application has been to crystalline substances, much useful information has been obtained from glasses, organic polymers and liquids.

These methods provide important basic information about materials and the diffracting goniometer has become one of the most useful tools for the chemist, mineralogist, crystallographer, metallurgist, ceramist, even the artist and astronomer. The technique is not limited to an X-ray source as diffracting goniometers for electrons and neutrons are known in the art.

The goniometer used either in spectrometry or diffractometry comprises three basic parts, namely, the source, the diffracting element and the detector. In the type of goniometer under consideration, the source provides a divergent beam which impinges upon the diffracting element whose center is at a fixed distance from the source. The detector is at the same distance from the center of the diffracting element as the source and is rotatable in unison with the diffracting element about an axis through the center of the diffracting element at its reflecting surface. The rotation of the diffracting element and detector is such that as the diffracting element rotates through a particular angle of incidence, $\theta$, the detector rotates through twice this angle, or $2\theta$.

The primary object of the present invention is to provide a means, in a goniometer of the character above described, for continuously bending the diffracting element during its rotation with the detector so that the source, substantially each point of the diffracting element and the detector (more particularly the entrance slit thereof) all lie on a common focussing circle so that all of the rays which have been diffracted by the diffracting element through the angle $2\theta$ will converge at the detector or pass through the entrance slit thereof. Thus the detector will see a sharp and very intense maximum at the correct angular position.

Another object of the invention is to provide a goniometer of the character described in which the bending of the diffracting element is effected by a cam means which is adjustable so that the goniometer can operate either as a spectrometer or a diffractometer.

A further object of the invention is to provide means operatively connected to the rotation of the diffracting element about the goniometer axis which will automatically bend the diffracting element so that its radius of curvature has a constant value over its reflecting surface and has the correct value at each diffraction angle.

Another object of the invention is to provide a goniometer of the character described with a means to effect a small rotation of the diffracting element about the goniometer axis independently of the angular movement of the detector and without changing the radius of curvature of the diffracting element to provide a fine adjustment.

Another object of the invention is to provide a means to adjust the mechanism for continuously bending the diffracting element so that the correct curvature of the diffracting element will be obtained over the entire angular range of rotation of the element and the detector.

Another object of the invention is to provide an elastic holder for the diffracting element which will assure uniform bending of the diffracting element over its entire length to obtain correct radii of curvature during the entire angular range of rotation of the diffracting element and the detector.

Further objects and features of the invention will become more apparent as the following description proceeds in conjunction with the accompanying drawings, wherein:

FIG. 2 is a diagrammatic view illustrating a diffractometer embodying this invention and the focussing of the diffracted rays from a bent diffracting element;

FIGS. 3 and 4 are diagrammatic views of a diffractometer employing the continuously bent diffracting element of the instant invention and illustrating the relation between the focussing circle and the goniometer circle;

FIG. 5 is a diagrammatic view of a spectrometer embodying this invention and illustrating the focussing conditions thereof;

FIG. 6 is a perspective view of one form of holder embodying this invention and constructed to impart uniform curvature to the diffracting material over its entire length;

FIG. 7 is a perspective view of a modified form of the holder of FIG. 6;

FIGS. 8 and 9 are perspective views of other forms of holders embodying this invention;

FIG. 10 is an elevational view, partly diagrammatic, of one form of goniometer embodying the principles of this invention;

FIG. 11 is a perspective view of yet another form of goniometer embodying the principles of this invention;

FIG. 13 is a side view of a mounting block for fabricating a variable thickness holder embodying this invention.

Specific reference is made to the drawings in which similar reference characters are used for corresponding elements throughout.

Figure 1:
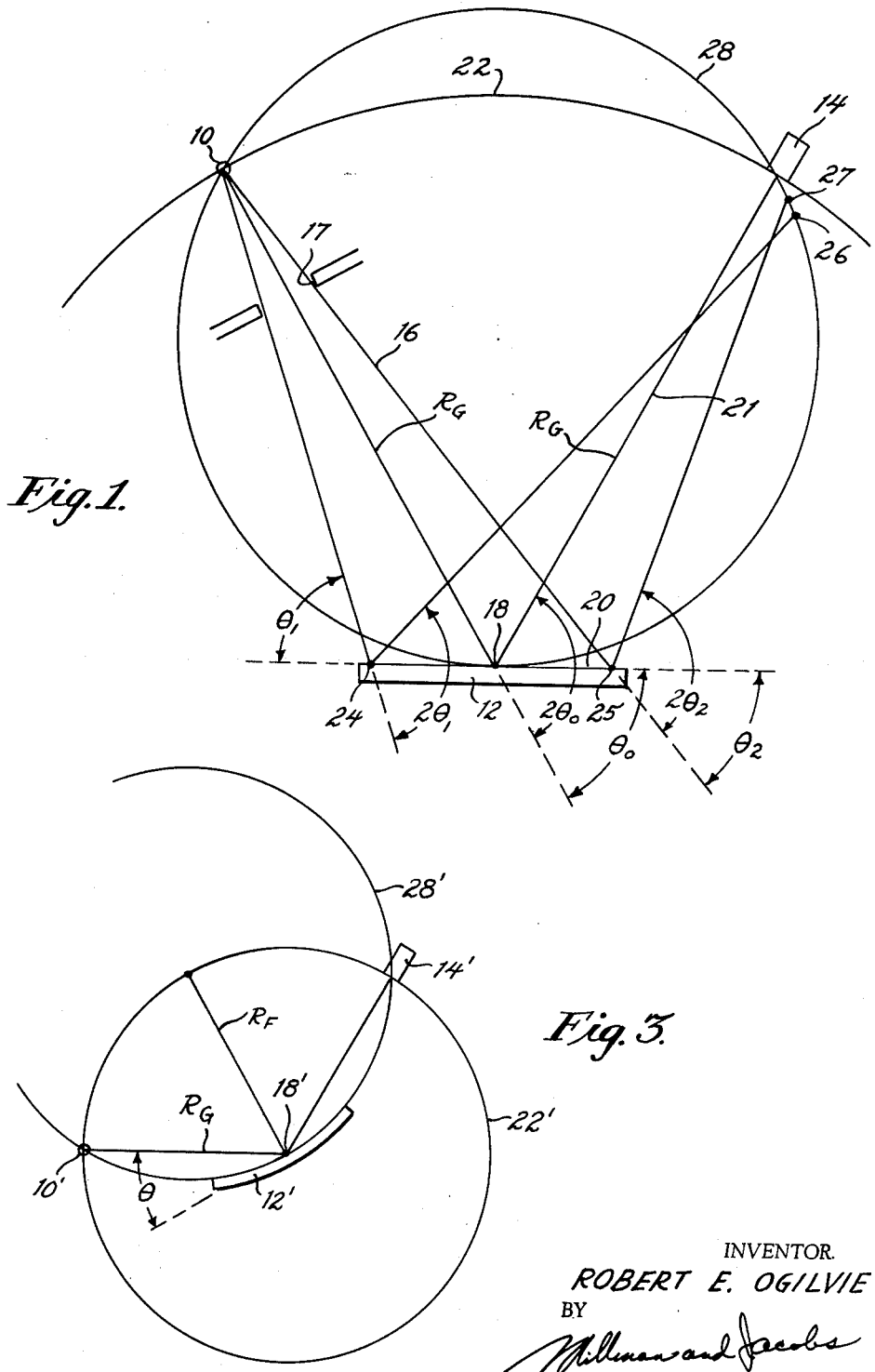
FIG. 1 is a diagrammatic view of a goniometer employing a flat diffracting element and illustrating the focussing problem encountered for divergent rays emanating from a point or line source.

A goniometer used either in spectrometry or diffractometry comprises three basic parts, a source 10 of X-rays or other diffractable radiation, such as electrons or neutrons, a diffracting element 12 and a detector 14. In the instant application the source is a point or line source providing divergent rays 16 which pass through a narrow restricting slit 17, the source being at a fixed distance $R_G$ from the center 18 of the reflecting surface 20 of the diffracting element, the detector 14 also being at this same distance from the center 18. The diffracting element and the detector are rotatable, by suitable means, in unison about an axis, the goniometer axis, through the center 18 and in the plane of the reflecting surface 20 of the diffracting element, so that the entrance slit of the detector can receive the diffracted beam 21. The goniometer axis is normal to the plane of the paper, and the path of the detector, being the goniometer circle, is shown at 22. The relative motion of the diffracting element rotates through a particular angle (incidence angle, $\theta$), the detector will rotate through twice said angle, or $2\theta$. A continuous scan can be made over the complete range of the incident angle $\theta$ (0-90°).

If the incident beam from the source is confined by the slit 17 so as to be restricted to a relatively small area of the diffracting element immediately around the center 18, only a small part of the diffracting element participates in the diffraction with the result that the intensity received by the detector is correspondingly small because the volume of the diffracting material itself is small. Thus it is desirable to illuminate a much larger area of the diffracting element so that the intensity will markedly increase, provided that substantially all of the diffracted rays will converge or focus at the detector (more particularly at its entrance slit).

This provision cannot be attained in a goniometer employing a flat diffracting element, as shown in FIG. 1. It will there be seen that the beam with a substantial divergence angle illuminates the diffracting element from one end 24 to the other end 25 thereof through the center 18. Since the diffracted ray from any point on the surface 20 must make an angle $2\theta$ with the incident ray, it is manifest that only the central ray diffracted from the center 18 enters the detector slit. The diffracted ray from point 24 will fall on the goniometer circle 22 at point 26, and from point 25 at point 27, both outside the detector or entrance slit thereof. Thus, the detector will not see a sharp maximum but rather a broad maximum somewhere between points 26 and 27 which is an incorrect measure of the actual diffraction angle. At the same time the intensities seen by the detector will be considerably less than if all the diffracted rays converged at the entrance slit of the detector.

By means of this invention, sharp focussing of the diffracted rays at the detector slit is attained. The focussing conditions for diffractometry are somewhat different from those for the spectrometry. The diffractometer is discussed initially and then the spectrometer.

The focussing geometry of a diffractometer embodying this invention is illustrated in FIGS. 2, 3, and 4 where parts corresponding to those previously described are referenced by similar numerals with the addition of a prime ('). In a diffractometer the source 10' of radiation has a known spectrum and the diffracting element 12' or specimen is unknown and is analyzed by the diffraction characteristic that is measured. The source 10' of radiation is a point or line source whose dimension is small relative to that of the diffracting element; i.e. the beam 16' is divergent and may be derived from the small focal spot of an X-ray tube. The focussing condition requires that the source 10', each point on the surface 20' of the diffracting element 12', and the detector 14' (i.e. its entrance slit) all lie on a common circle.

This focussing condition is attained by continuously bending the diffracting element to conform to the curvature of the focussing circle 28'. Since the focussing circle is determined by the relative positions of the source 10', the center 18' of the diffracting element, and the detector 14' and the latter moves relative to the other two, the radius $R_F$ of the focussing circle must change. FIG. 3 shows the condition for a relatively small diffraction angle of about 30° and FIG. 4, for a relatively large diffraction angle of about 60°. Consequently, the radius of curvature of the diffracting element must be different for each value of the diffraction angle if it is to conform to the correct focussing circle. The correct radius of curvature $R_F$ is given by the expression:

$$R_F = \frac{R_G}{2 \sin \theta}$$

where $R_G$ is the radius of the goniometer circle.

As will appear hereinafter, means are provided coupled to the diffracting element to bend the same automatically as it rotates about the goniometer axis so that its radius of curvature is at the correct value at each diffraction angle. A further means is provided, as will also appear later, to insure the radius of curvature of the diffracting element is uniform or has a constant value over its surface 18. As will also appear hereinafter, a means is provided to effect a small rotation of the diffracting element about the goniometer axis 18 independently of the angular movement of the detector without changing the radius of curvature of the diffracting element to effect a fine adjustment.

In diffractometry, the source provides a beam of accurately known wavelength incident on the specimen which constitutes the diffracting element. In this application, the specimen diffracting element may be any crystalline substance in powder form suspended in a binder and adhered in a thin uniform layer to an elastic holder (FIG. 6). The specimen is thereby formed as a polycrystalline material, and for any radius of curvature of the specimen, there is available a large number of randomly oriented crystal planes that are tangent to the focussing circle 28'. Consequently, for any angle $\theta$ and corresponding radius of curvature of the diffracting element 12', the rays diffracted through $2\theta$ at all points on the surface 20' are properly focussed at the detector 14'. Thereby, true and accurate focussing is achieved since, effectively, the diffracting element conforms everywhere over its length to the focussing circle.

The focussing geometry of a spectrometer embodying this invention is illustrated in FIG. 5 in which parts corresponding to those previously described are referenced by similar numerals with the addition of a double prime (''). In a spectrometer the source 10'' has an unknown spectrum (it may be the small focal spot on a specimen in an X-ray microanalyzer), and the diffracting element is a thin single crystal sheet with parallel faces which is bonded to a holder, the sheet having an important family of atomic planes parallel to its surface. Since each ray of the divergent beam 16 incident upon the diffracting element should make the same angle of incidence $\theta$ with the atomic diffracting plane of the crystalline sheet, the radius of curvature of the diffracting plane $R_p$ (FIG. 5) is given by the expression $$R_p = \frac{R_G}{\sin \theta}$$

where $R_G$ is the goniometer radius. Thus, $R_p$ is twice the radius of the focussing circle $R_F$. This condition cannot be achieved simultaneously with the condition that each point on the surface 20'' of the diffracting element lie on the focussing circle 28''. If the center of the crystal 12'' coincides with the center 18'' of the goniometer, the ends 24″ and 25″ are spaced a slight distance from the focussing circle 28″, and if the ends of the crystal 12″ are positioned on the focussing circle, the center of the crystal would be displaced a slight distance away. A satisfactory approximation has been achieved, as shown in FIG. 5, to reduce the effect of this displacement. Thus, the diffracting element 12″ is bent to the radius $R_P$, and its center is displaced from the center 18″ of the goniometer by a small amount. This displacement is chosen so that the true focussing circle 28″ cuts the surface 20″ at points 29 and 31 which are between the center 18″ and the end points 24″ and 25″ respectively; an optimum approximation is achieved with points 29 and 31 being midway so that they form quarter-points along the length of the crystal. The correct displacement of the center of the crystal theoretically should vary slightly and directly as the diffraction angle. A practical compromise is to set the displacement at about the mid-range of diffraction angles.

In order for the diffracting element to have a radius of curvature which is uniform or has a constant value over its surface 20′ or 20″, holders are provided which are shaped to have either a variable width and constant thickness, FIGS. 6 and 7, or a variable thickness and constant width, FIGS. 8 and 9, to act as beams in symmetrical three-point loading. To provide this function, the theoretical shape of a holder of uniform thickness but variable width should be a diamond, or one in which the width at any section is proportional to its distance from the end and is symmetrical about the transverse center line. The holder 30 of FIG. 6 is substantially diamond in shape except for end tabs 32 and 34 adapted to be engaged by a member of the bending means, as will appear later. The holder is made of metal or other elastic substance and the diffracting material or substance 36 (spectrometer crystal 12″ or diffractometer specimen 12′) in the form of a thin layer of uniform thickness is bonded or otherwise secured thereto to extend over the major length of the holder between the tabs. Thus, the radius curvature of the material 36 is constant over the distance between the tabs. The central bending support may be in the form of circular rods 50 or knife edges positioned along the central diagonal of the diamond and spaced from the diffracting material 36 so as not to interfere with the incident and reflected rays.

In FIG. 7 the holder 30′ has a diamond shape similar to that shown in FIG. 6 except that the area 38 between the tabs is hollow to form a frame with a window. The diffracting material 36, e.g. a thin crystal or self-supporting layer (or a mylar cell containing the material) may be cemented to the holder to cover the window. The window prevents the incident beam from striking the material of the holder and thereby producing unwanted scattered radiation. The width of the frame is made variable to ensure uniform bending as explained above. With the window holder of FIG. 7, the diffracting element may be placed on the underside thereof (as viewed by the incident rays) so that the diffracting element is placed under tension during bending and, accordingly, does not buckle.

The holder 40 of FIG. 8 is of variable thickness but of uniform width, having a flat face 42 and an opposed curved face 44. The theoretical shape for bending with a uniform radius of curvature is one in which the thickness at any section is proportional to the cube root of its distance from the end and symmetrical about the transverse center line; this shape may be approximated with reasonably good results. The diffracting material 36 is applied to the flat face 42 which faces the incident rays. This variable thickness holder may also be modified to provide a hollowed-out portion or window 46 centrally through the major length of the holder 40′, as seen in FIG. 9, which can be covered by the diffracting material 36 placed on the flat face. The diffracting surface can then be placed on the tension side as the holder 40′ is bent, and the holder is placed in the bending device with the curved face facing the incident radiation. The variable thickness holders are mounted in the bending device with the bending rods 50 or knife edges along the central transverse axis in a manner similar to that for the variable width holders shown in FIG. 6.

A suitable approximation of the theoretical shape for the variable thickness holder 40 may be attained by the method illustrated in FIG. 13. A rectangular block 41 is formed with a central rectangular groove 43 of length equal to that of the desired holder length and of depth equal to three-fourths of the thickest portion of the holder. A rectangular metal plate 45 of desired thickness is placed across the block 41 and attached to it under full tension, for example, by a central fastener. The upper surface of the plate 45 is cut off parallel to the groove of the block 41 and spaced from the top thereof by one-fourth of the holder thickness (i.e., cut tangent to the central point of the bent plate 45). The plate is then removed, and takes the form shown in broken lines. The tips at the one-fourth thickness points are cut off, and the resulting shape is suitable for use as a variable thickness holder.

The holder may be made of spring steel, full hard Phosphor bronze, beryllium copper or other material of sufficiently high yield strength so that it will bend elastically to the desired curvatures without taking a permanent set. Because the amount of bending is actually quite small, this elastic behavior can be met by a variety of materials. The diffracting material may be a fine powdery substance suspended in a suitable binder to form a thin uniform layer, as in diffractometry, or a thin sheet of crystal (i.e., mica). The layer must be sufficiently thin, relative to the holder as to provide no significant restraint to the bending of the holder; thereby, the layer does not influence the curvature of the holder which determines the proper curvature of the layer.

Figure 12:
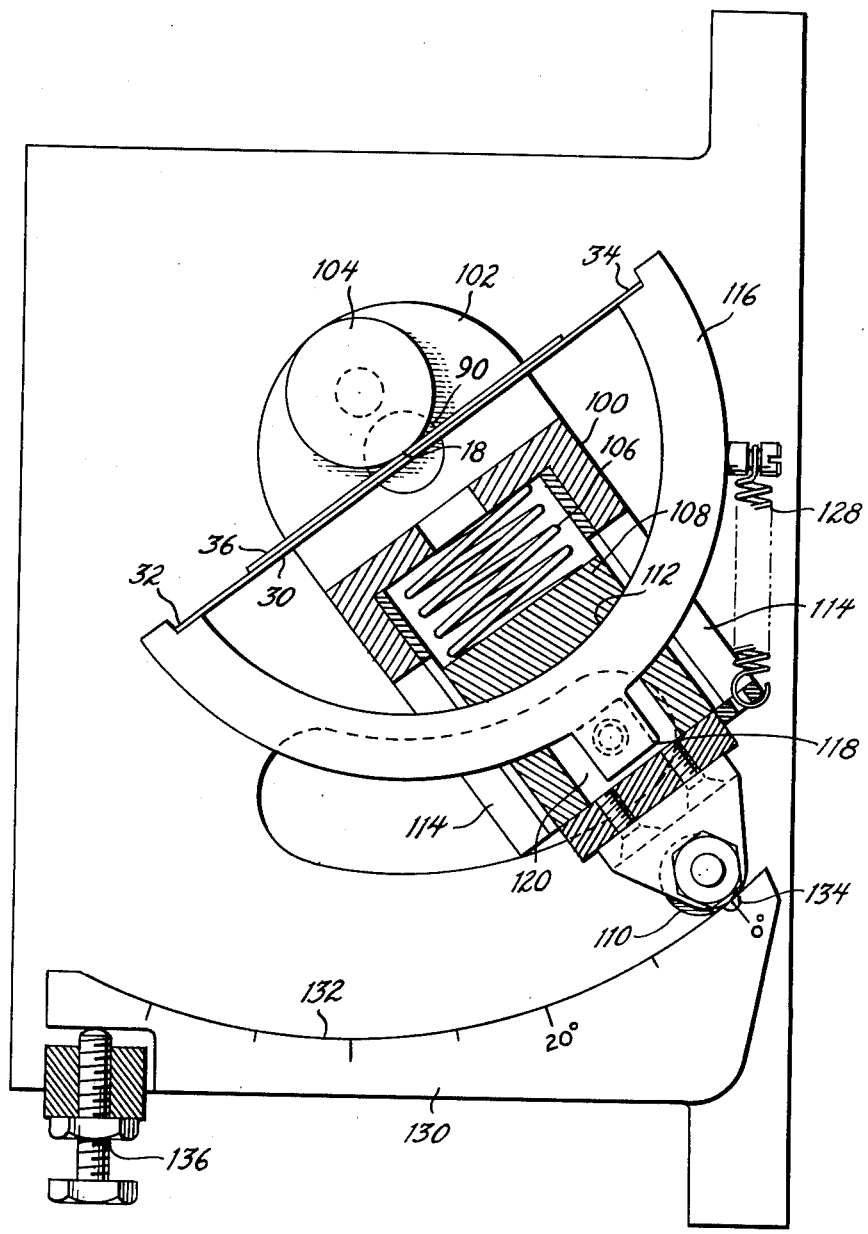
FIG. 12 is a longitudinal sectional view through the member in FIG. 11 that supports the diffracting element.

The means to continuously and automatically bend the diffracting element during its rotation with the detector as well as the means to effect small rotation of the diffracting element independently of the bending means and the movement of the detector are shown in FIGS. 10, 11, and 12. Coming first to FIG. 10, a bifurcated member 48 (only one branch of which is shown in FIG. 10) is provided which carries one of the rods 50 adjacent the upper end of each branch. The rods 50 are aligned (as shown in FIG. 6) and support the center of the holder 30 or 40 and act as bending elements therefor. The lower portion of the rods 50 coincide with the goniometer axis 18 in one form of the invention and may be fixed in that position. This location of the bending axis coincident with the goniometer axis is employed for operation of the goniometer as a diffractometer, where the center of the specimen surface is on that axis. This location of the bending axis (formed by the lower tangent line of the rods 50) may be employed when operating the equipment as a spectrometer; however, as explained above in connection with FIG. 5, improved operation is attained with the bending axis at the center of the crystal located a short distance from the goniometer axis so that the quarter points of the crystal lie on the focussing circle. Appropriate variations in the location of the bending axis may be made where the specimen or crystal is mounted under the holder 30 to accommodate the thickness of the latter.

The bending rods 50 may be fixed in position on the member 48, as shown in FIG. 10, or they may be adjustably mounted thereon as shown in FIG. 6. In the latter, the rods 50 are each fixed to and project from a separate slide 51 movable in a slideway formed on the associated branch of the member 48. A set screw 53 retains the slide 51 in its adjusted position. The slides 51 of the two rods may be appropriately interconnected so that their adjustment can be coordinated. By adjusting the bending axis in this way, the goniometer may be readily used as either a diffractometer or a spectrometer and the preferred location of the bending axis set in each case. The adjustability of the bending axis is also advantageous in permitting use of different thicknesses of crystal holders and different thicknesses of crystals or specimens and in being able to mount the crystal or specimen alternatively on either the upper or lower face of the holder. That is, this adjustment makes it possible to locate the center of the crystal or specimen at the proper point with respect to the center of the goniometer and to adjust the bending axis as required in each case.

In the goniometer of FIG. 10, a yoke 52 is provided, preferably semi-circular and concentric with the goniometer 18 whose ends are notched out to support the ends of the holder (the tabs 32 and 34 of holder 30 or the ends of holder 40). The member 48 includes a bearing 54 which slidably receives a yoke-supporting unit 56 adapted to move along a line passing through the goniometer center 18. The unit 56 includes a block 58 having an arcuate groove 60 therethrough for slidably receiving the yoke. The yoke is provided with projecting lugs 62 through which adjusting screws 64 extends and are adapted to bear on the opposite sides of the block 58.

The lower end of the yoke support 54 is provided with a cam follower in the form of a roller 66. The member 48 is operatively connected to a goniometer shaft 68 and rotates with it about the goniometer axis through the center 18. A cam 70 which is a segment of a circle is attached to the base of the goniometer (not shown) and has a cam face 72 engaged by the roller 66. The base carries an internally threaded member 74 which threadedly receives an adjusting screw 76 adapted to bear on a portion of the cam at its face opposite cam face 72. One end of the cam includes a pivot pin 78 whose axis lies in the cam face 72 and is adjustable along a line through the center 18 of the goniometer by a block 80 which is slidable between a pair of members 82 carried by the goniometer base, there being a set screw 84 extending through an internally threaded member 86 on the base and adapted to bear on the block 80.

If the cam 70 is adjusted by screw 76 so that its face 72 is concentric with the goniometer axis and the diffracting element is rotated to different values of the diffracting angle, the surface of the diffracting element remains flat because there is no displacement of the yoke 52. To bend the diffracting element to the correct radius of curvature for focussing at each angle, the path to be followed by the cam roller 66, when operated as a diffractometer, is given by the expression:

$$R = R_0 - \frac{L^2}{4R_G} \sin \theta$$

where L is the distance between points 24 and 25, i.e., the length of the holder, $R_G$ is the goniometer radius, $R_0$ is the radius of curvature of the cam and also the distance from pivot pin 78 to the goniometer axis 18 when the goniometer is at the zero setting and the diffracting angle is flat, $\theta$ is the diffraction angle and R is measured from the goniometer axis 18 to the face 72 of the cam. For operation as a spectrometer, the cam equation is generally the same except for the term in the denominator which is $8R_G$, due to $R_P$ being twice $R_F$ as explained above.

This path can be approximated with vanishingly small error by advancing screw 76 and tilting cam 70 so that it is no longer concentric with the goniometer axis. The adjustment is made very simply. With the goniometer set at a diffraction angle of zero, pivot 78 is adjusted by screw 84 until the diffracting element surface 20 is exactly flat. The goniometer is then turned to an intermediate diffraction angle, in particular the approximate angle $\theta$ where a strong diffracted beam is known to occur (from some knowledge of the specimen in the case of the diffractometer and the spectrum in the case of the spectrometer) as shown in FIG. 10. At this setting a signal will be observed at the detector which is linked to be rotated to the 2θ position. Screw 76 is now advanced to rotate cam 70 about its pivot 78 and bend the diffracting element. The correct setting is the one corresponding to maximum signal from the detector. This means that the surface 20 of the diffracting substance 36 has the correct radius of curvature and that all of the rays diffracted through the angle 2θ now converge at the entrance slit of the detector. The instrument is now set so that substantially the correct curvature of the diffracting element will be obtained over the entire range from 0 to θ. The cam 70 is effectively "tuned in" to the appropriate cam equation by the θ setting thereof in accordance with some known characteristic of the diffracting specimen or radiation spectrum depending on whether it is used as a diffractometer or spectrometer, respectively. Consequently, the instrument functions effectively as either one depending on its adjustment. Once the operator has correctly adjusted the cam for, say, diffractometry, it is readjusted for spectrometry by means of screw 86.

One final fine adjustment may be required: Even though the surface of the diffracting element has the correct curvature, it may be slightly tilted about the goniometer axis so that the surface does not conform exactly to the focussing circle. Conformity can be obtained by rotation of screws 64 which permit the yoke 52, in effect, to be rotated or "rocked" through a small angle about the goniometer axis relative to its support 56 without changing the radius of curvature and moving the detector. This adjustment permits certain mechanical tolerances, such as those involved in the rotation of the goniometer, to be accommodated. The correct adjustment again is found by maximizing the signal from the detector. Adjustments of screws 76 and 64 are made successively several times until the best detector response is observed. The cam 70 and yoke 52 are now in the correct position so that the diffracting element will automatically be bent to the correct curvature and positioned properly with respect to the focussing circle for any setting of the diffraction angle. Accordingly, the instrument is ready for use.

The adjustment of the cam pivot 78 makes it possible to accommodate mechanical tolerances and ensure that the crystal holder is perfectly flat at the 0 setting.

A mechanical variant of the instrument is shown in FIGS. 11 and 12 which illustrate certain mechanical structures that have been found suitable in one form of the invention; other forms of the invention will be evident from the foregoing description. The detector 14 is mounted on an arm 88 which is secured to goniometer shaft 90 for rotation therewith, the shaft being coupled as by gearing 92 to a further shaft 94 which is driven by a motor (not shown) via a manually operable variable clutch device (not shown) to select a rate of rotation of the goniometer shaft and hence the scan rate. By appropriate gearing 96 which reduces the rotation by one-half, the goniometer shaft 90 is coupled to a unit 98 in the form of a cylinder 100 having upper furcations 102. At their inner faces, the furcations carry lugs 104 which bear on the sides of the holder 30 along a transverse center line which passes through the center of rotation 18.

Mounted slidably in the cylinder 100 and urged outwardly thereof by a spring 106 is a piston 108 to the corner end of which is attached a cam follower or roller 110 whose axis is in alignment with the goniometer center 18. Extending through a slot 112 in the piston 108 and through diametrically opposed axially extending openings 114 in the cylinder 100 is a semicircular yoke 116 whose ends are notched to support the ends 32 and 34 of the holder 30. The yoke also includes a depending wedge-shaped lug 118 which extends into a cavity 120 in the piston 108, the inclined face of which is adapted to be engaged by a conventional flexible shaft 122 movable in and out of a shield 124 by a rotatable knob 126. A spring 128 is terminally secured to the bottom of the cylinder 100 and one side of the yoke 116 acting to urge the inclined face of the wedge 118 against the shaft 122.

A cam 130 is provided with a cam face 132 which engages the roller 110 and which is a segment of a circle in the manner of cam 72 of FIG. 10. At one end the cam is pivoted as at 134 to a supporting member; and at its other end, a set screw 136 is provided on the supporting member which is adapted to bear against the cam and tilt it about its pivot axis to desired non-concentric positions of the cam track 132 relative to the goniometer axis in the manner described above to operate the instrument as a spectrometer or a diffractometer. When the desired position of non-concentricity of the cam is set, rotation of the unit 98 and the detector 14 through the scan angle will cause the yoke 116 to move upwardly and bend the holder and the diffracting material 36 at its ends. The lugs 104 serve as a means applying a reactive force at the central transverse axis of the diffracting element. By turning knob 126, shaft 122 bearing on wedge 118 will cause the yoke 116 to rotate over a small range independently of the bending of the diffracting element and rotation of the detector as a fine adjustment to place the diffracting surface 20 in the proper position with respect to the focussing circle 28.

A correctly adjusted and automatically bent diffracting element effects significant improvments over a flat element. The signals are of much greater intensity; there is angular resolution for the precise measurement of diffraction angles and a greater ratio of signal to background intensity which improves the accuracy of measurement of weak diffracted beams. It also permits application of the goniometer to problems which cannot be handled successfully with a flat diffracting element.

To derive certain of the relationships set forth above, each of the crystal and specimen holders of FIGS. 6–9 may be considered as a beam supported at the ends and loaded at the center. For this loading, the radius of curvature $R_X$ at a distance X from one end is given by the formula $$R_X = \frac{Ebh^3}{6WX}$$

where E is Young's modulus of the holder material; $b$, the width of the holder; $h$, the thickness; W, the load at the center. To obtain a constant $R_X$ between the ends of a holder of constant thickness $h$, the width $b$ is varied directly as X, on each side of the center, as in the diamond shape of FIGS. 6 and 7. Correspondingly in a holder of constant width $b$, the thickness $h$ is varied as the cube root of X symmetrically about its center, as in the holders of FIGS. 8 and 9. In either case, the flat face of the holder is bent in a circular arc and the deflection is given by the expression $$\frac{L^2}{8R}$$

where L is the length of the holder between its end supports, and R is the radius of curvature $R_F$ or $R_P$ depending on whether the instrument is operated as a diffractometer or spectrometer. By substituting the appropriate expressions given above for $R_F$ and $R_P$, one may derive the equations given above for the radius of the path to be traced by the cam follower when operating the instrument either as a diffractometer or spectrometer.

While preferred embodiments have been shown and described herein, skilled artisans may make minor variations without departing from the spirit of the invention and the scope of the appended claims.

What is claimed is:

1. A goniometer having a source of divergent rays, a detector, means for mounting a diffracting element in a certain geometrical relation to said source and detector, means to rotate said detector and said diffracting element mounting means in unison at a predetermined ratio about an axis, and means for continuously bending said diffraction element in accordance with said rotation, said bending means including adjustable means for selectively changing the bending of said element to be in accordance with different functions of the angle of said rotation, which functions correspond respectively to operation as a diffractometer and a spectrometer, whereby the goniometer is selectively and alternatively operable as a diffractometer or a spectrometer.

2. A goniometer as recited in claim 1 wherein said adjustable means includes means for moving said mounting means in accordance with different functions of the angle of said rotation.

3. A goniometer as recited in claim 1 wherein said bending means includes means for adjustably establishing said axis of rotation.

4. A goniometer having a source of divergent rays, a detector, means for mounting a diffracting element in a certain geometrical relation to said source and detector, means to rotate said detector and said diffracting element mounting means in unison at a predetermined ratio about an axis, and means for continuously bending said diffraction element in accordance with said rotation, said bending means including adjustable means for selectively changing the bending of said element to be in accordance with different functions of the angle of said rotation for operation either as a diffractometer or a spectrometer, said bending means includes a cam, and means including a cam follower connected to said mounting means for controlling the bending of said diffracting element, and said adjustable means includes means for adjusting said cam relative to said axis to change the path of said cam follower.

5. The combination of claim 4 wherein said adjustable means includes means pivoting one end of said cam about an axis substantially parallel to said axis of rotation and means operative upon another portion of said cam to tilt said cam about said pivot and retain said cam in a selected position.

6. The combination of claim 5 wherein said pivoting means is adjustable on a line through the center of said diffracting element.

7. In a goniometer having a source of divergent rays, a diffracting element whose center is at a fixed distance therefrom, a detector, means to rotate said detector and said diffracting element in unison at a predetermined ratio about an axis substantially at the surface of and through said center of said diffracting element and means continuously bending said diffracting element during and in accordance with the rotation, and adjustable means to rotate said diffracting element about said axis of rotation independently of the movement of said detector and said bending means, whereby adjustments of the diffracting element can be made without moving the detector and without changing the radius of curvature of the diffracting element.

8. In a goniometer for use as a diffractometer having a source of rays of known wavelengths, a diffracting element constituting the specimen whose center is at a fixed distance from said source, a detector, means to rotate said detector and diffracting element in unison at a predetermined ratio about an axis at the surface of said diffracting element and through its center, and means continuously bending said diffracting element during and in accordance with the rotation so that said source, each point of said diffracting element and said detector all lie in common focussing circles during said rotation, said diffracting element having elements thereof tangent to said focussing circle at all portions thereof.

9. A diffractomer as recited in claim 8 wherein said diffraction material is in the form of a polycrystalline material having randomly oriented crystal planes.

10. A diffractomer as recited in claim 8 wherein said bending means includes means for maintaining the radius of curvature of said diffraction element in accordance with the relationship $$\frac{R}{2 \sin \theta}$$

where $\theta$ is the angle of rotation of said element and R is the distance between said element center and said source.

11. In a diffractometer having a source of rays of known wavelengths, a diffracting element constituting the specimen whose center is at a fixed distance from said source, a detector, means to rotate said detector and diffracting element in unison at a predetermined ratio about an axis at the surface of said diffracting element and through its center, means continuously bending said diffracting element during and in accordance with the rotation so that said source, each point of said diffracting element and said detector all lie in a common focussing circle during said rotation, and means to rotate said diffracting element about said axis of rotation independently of the movement of said detector and said bending means, whereby adjustments of the diffracting element can be made without moving the detector and without changing the radius of curvature of the diffracting element.

12. In a spectrometer having a source of rays caused by excitation of an unknown specimen, a diffracting element, ad etector, means to rotate said detector and diffracting element in unison at a predetermined ratio about an axis which is displaced a predetermined distance from the center of the surface of said diffracting element, and which axis with said source and said detector lies on a common focussing circuit, and means continuously bending said diffracting element during rotation so that said common focussing circle intersects said diffracting element at points substantially midway between said center of said diffracting element and its ends.

13. In a spectrometer having a source of rays caused by excitation of an unknown specimen, an elongated diffracting element, a detector, means to rotate said detector and diffracting element in unison at a predetermined ratio about an axis which is displaced a predetermined distance from the center of the surface of said diffracting element, and which axis with said source and said detector lies on a common focussing circle, means continuously bending said diffracting element during rotation so that said common focussing circle intersects said diffracting element at points substantially midway between said center of said diffracting element and its ends, and means to rotate said diffracting element about said axis of rotation independently of the movement of said detector and said bending means.

14. In a goniometer having a source of divergent rays, a diffracting element whose center is at a fixed distance therefrom, a detector, means to rotate said detector and said diffracting element in unison at a predetermined ratio about an axis substantially at the surface of and through said center of said diffracting element and means continuously bending said diffraction element about said axis during and in accordance with the rotation, said diffracting element including an elastic holder and a layer of diffracting material secured thereto and bendable therewith and of thickness insufficient to significantly restrain the bending of said holder by said bending means, said holder being shaped to provide substantially uniform curvature over the entire length of said diffracting material for each bent condition thereof.

15. In a goniometer having a source of divergent rays, a diffracting element whose center is at a fixed distance therefrom, a detector, means to rotate said detector and said diffracting element in unison at a predetermined ratio about an axis substantially at the surface of and through said center of said diffracting element and means continuously bending said diffraction element about said axis during and in accordance with the rotation, said diffracting element including an elastic holder and a layer of diffracting material secured thereto of thickness insufficient to significantly restrain the bending of said holder, said holder being shaped to provide substantially uniform curvature over the entire length of said diffracting material for each bent condition thereof, wherein said holder being substantially diamond in shape and of uniform thickness, said diffracting material extending centrally of and over the major length of said holder.

16. The combination of claim 15 wherein said holder is hollow in the area of said diffracting material to prevent the incident beams from striking said holder and providing undesirable scattered radiation.

17. In a goniometer having a source of divergent rays, a diffracting element whose center is at a fixed distance therefrom, a detector, means to rotate said detector and said diffracting element in unison at a predetermined ratio about an axis substantially at the surface of and through said center of said diffracting element and means continuously bending said diffraction element about said axis during and in accordance with the rotation, said diffracting element including an elastic holder and a layer of diffracting material secured thereto of thickness insufficient to significantly restrain the bending of said holder, said holder being shaped to provide substantially uniform curvature over the entire length of said diffracting material for each bent condition thereof, wherein said holder being uniform in width but of variable thickness, one face being flat and other so curved that the holder is thickest at its center and symmetrical about a tranverse center line, said diffracting material being secured either to said flat or said curved face and extending over the major length of said holder.

18. The combination of claim 17 wherein said holder is hollow in the area of said diffracting material to prevent the incident beams from striking said holder and producing undesirable scattered radiation.

19. In a goniometer having a source of divergent rays, a diffracting element whose center is at a fixed distance therefrom, a detector, means to rotate said detector and said diffracting element in unison at a predetermined ratio about an axis substantially at the surface of and through said center of said diffracting element and means continuously bending said diffraction element during and in accordance with the rotation, said bending means comprising a member bearing centrally on one face of said diffracting element, a circular yoke engaging the other face of said diffracting element at points on both sides of said center of said diffracting element, a support for said yoke movable along a line passing through said center of said diffracting element and adjustably supporting said yoke for rotation about its axis, and means causing said yoke and support to move along said line during rotation of said detector and said diffracting element.

20. In a goniometer having a source of divergent rays, a diffracting element whose center is at a fixed distance therefrom, a detector, means to rotate said detector and said diffracting element in unison at a predetermined ratio about an axis substantially at the surface of and through said center of said diffracting element and means continuously bending said diffraction element during and in accordance with the rotation, said bending means comprising a member bearing centrally on one face of said diffracting element, a yoke engaging the other face of said diffracting element at points on both sides of said center of said diffracting element, a support for said yoke movable along a line passing through said center of said diffracting element, and means causing said yoke and support to move along said line during rotation of said detector and said diffracting element, including a cam roller carried by said yoke support, a cam engaged by said cam roller, said cam being a segment of a circle, and means to adjustably retain said cam in positions of nonconcentricity relative to said center of said diffracting element.

21. The combination of claim 20 wherein said adjustable cam retaining means includes means pivoting said cam about an axis parallel to the axis of rotation of said detector and diffracting element, and set screw means operative upon a portion of said cam to tilt and retain it in said non-concentric positions.

22. The combination of claim 21 and means to adjust said pivot axis along a line passing through said center of said diffracting element.

23. In a goniometer having a source of divergent rays, an elongated diffracting element whose center is at a fixed distance therefrom, a detector at the same distance from said center, means to rotate said detector and said diffracting element in unison at a predetermined ratio about an axis substantially at the reflecting surface of and through said center, and means operative upon said diffracting element to continuously bend the same about a transverse axis through said center during and in accordance with the rotation of said diffracting element and said detector, said diffracting element including at least one elastic holder, and said bending means including means for adjustably defining said axis to be substantially at either of opposite surfaces of said holder, whereby holders of different thicknesses may be used and diffracting material may be applied to opposite surfaces of said holder.

24. In a goniometer having a source of divergent rays, an elongated diffracting element whose center is at a fixed distance therefrom, a detector at the same distance from said center, means to rotate said detector and said diffracting element in unison at a predetermined ratio about an axis substantially at the reflecting surface of and through said center, and means operative upon said diffracting element to continuously bend the same about a transverse axis through said center during and in accordance with the rotation of said diffracting element and said detector, said bending means including a cam follower mounted for movement along a path through said center, a cam having a track engaging said cam follower, said track being a segment of a circle, and means to adjust said cam so that said track is retained in desired positions non-concentric relative to said center.

25. In a goniometer having a source of divergent rays, an elongated diffracting element whose center is at a fixed distance therefrom, a detector at the same distance from said center, means to rotate said detector and said diffracting element in unison at a predetermined ratio about an axis substantially at the reflecting surface of and through said center, and means operative upon said diffracting element to continuously bend the same about a transverse axis through said center during and in accordance with the rotation of said diffracting element and said detector, said bending means including a cam follower mounted for movement along a path through said center, a cam having a track engaging said cam follower, said track being a segment of a circle, and means to adjust said cam so that said track is retained in desired positions non-concentric relative to said center, said diffracting element including a relatively thin layer of diffracting material and an elastic holder mounting the same, said holder being shaped to provide substantially uniform curvature over the entire length of said diffracting material.

26. The method of diffractometry with a source of diffractable radiation of known spectrum comprising positioning a flexible layer of specimen material in polycrystalline form and having a large number of randomly oriented crystal planes in the path of the diffractable radiation to diffract said radiation, rotating and bending said specimen about a fixed axis to focus successively the radiation at spaced points along a goniometer circle having its center on said axis, and moving a radiation detector along said goniometer circle with the rotation of the specimen material to receive said focussed radiation, the rotation and bending of said crystal and the movement of said detector being so related that the curvature of the diffracting material conforms to the goniometer circle that includes the source of radiation and the detector.

References Cited by the Examiner

UNITED STATES PATENTS

| | | | |
|---|---|---|---|
| 2,452,045 | 10/48 | Freedman | 250—51.5 |
| 2,540,821 | 2/51 | Harker | 250—51.5 |
| 2,653,249 | 9/53 | Harker | 250—51.5 X |
| 2,666,147 | 1/54 | Borst | 250—51.5 X |
| 2,853,617 | 9/58 | Berreman | 250—51.5 |
| 3,032,656 | 5/62 | Hosemann et al. | 250—51.5 |
| 3,073,952 | 1/63 | Rose | 250—51.5 |

RALPH G. NILSON, *Primary Examiner.*